US012025141B1

(12) United States Patent
Kipnis

(10) Patent No.: US 12,025,141 B1
(45) Date of Patent: Jul. 2, 2024

(54) FAN COMPRESSOR SUPERCHARGER/WATER PUMP

(71) Applicant: Cyclazoom, LLC, Skokie, IL (US)

(72) Inventor: Michael Kipnis, Skokie, IL (US)

(73) Assignee: Cyclazoom, LLC, Skokie, IL (US)

( * ) Notice: Subject to any disclaimer, the term of this patent is extended or adjusted under 35 U.S.C. 154(b) by 0 days.

(21) Appl. No.: 18/506,603

(22) Filed: Nov. 10, 2023

(51) Int. Cl.

| | |
|---|---|
| ***F04D 19/02*** | (2006.01) |
| ***F01D 25/24*** | (2006.01) |
| ***F02B 37/00*** | (2006.01) |
| ***F04D 29/52*** | (2006.01) |

(52) U.S. Cl.
CPC ............. *F04D 19/02* (2013.01); *F01D 25/24* (2013.01); *F02B 37/00* (2013.01); *F04D 29/522* (2013.01); *F05D 2220/40* (2013.01); *F05D 2240/14* (2013.01)

(58) Field of Classification Search
CPC .......... F04D 19/02; F02B 33/00; F02B 33/32; F02B 33/40
See application file for complete search history.

(56) References Cited

U.S. PATENT DOCUMENTS

| | | | | |
|---|---|---|---|---|
| 3,867,813 A * | 2/1975 | Leibach | F02K 3/077 60/225 |
| 4,693,669 A | 9/1987 | Rogers, Sr. | |
| 5,586,540 A * | 12/1996 | Marzec | F02B 33/44 123/565 |
| 6,295,974 B1 * | 10/2001 | McCants | F02B 39/10 123/565 |
| 6,360,731 B1 | 3/2002 | Chang | |
| 6,769,411 B2 * | 8/2004 | Fabiani | F02D 41/0007 123/542 |
| 7,107,974 B2 * | 9/2006 | Yang | F02D 41/0002 123/565 |
| 9,982,590 B2 | 5/2018 | Hashimoto et al. | |
| 11,193,391 B2 | 12/2021 | Iwakiri | |
| 11,536,153 B2 * | 12/2022 | Morgan | F02C 6/02 |
| 2008/0148708 A1 * | 6/2008 | Chou | F01D 5/02 60/268 |
| 2013/0051982 A1 * | 2/2013 | Hindle | F01D 25/164 415/119 |
| 2016/0177897 A1 | 6/2016 | Naruoka et al. | |
| 2019/0162074 A1 * | 5/2019 | Seshadri | F04D 29/526 |
| 2022/0340303 A1 | 10/2022 | Benson | |

* cited by examiner

*Primary Examiner* — J. Todd Newton
*Assistant Examiner* — Cameron A Corday
(74) *Attorney, Agent, or Firm* — Brian Roffe

(57) ABSTRACT

Supercharger includes a housing having a truncated conical shape formed by a conical wall with an open, inlet end and an open, discharge end, multiple rotatable shafts each having a forward end in the housing, and a respective compressor wheel attached to the end of each shaft situated in the housing. The compressor wheels each include a tapering outer ring and blades between the outer ring and the respective shaft. One embodiment includes three shafts and three compressor wheels. Rotation of the shafts causes rotation of the compressor wheels and compression of air (or water) by the supercharger with the compressed air (or water) being discharged from the housing at the discharge end.

20 Claims, 2 Drawing Sheets

FAN COMPRESSOR SUPERCHARGER/WATER PUMP

FIELD OF THE INVENTION

The present invention relates to an axial-type supercharger, such as a supercharger mountable on the intake manifold of an automobile. The supercharger may be typically directly mounted in the intake manifold and driven, for example, by an engine to increase the quantity of air in the combustion chamber to increase the output horsepower of the engine.

BACKGROUND OF THE INVENTION

Superchargers have various uses. Typically, a supercharger is configured to compress combustion air of an internal combustion engine to send high-density air to a combustion chamber. Such a supercharger has been broadly used for a two-stroke low-speed engine such as a marine diesel engine and a power generation diesel engine, or the other types of engines. In such superchargers, a compressor configured to compress combustion air and a turbine serving as a drive source of the compressor are connected to a rotor shaft, and are housed in a casing, to rotate together.

U.S. Pat. No. 4,693,669 (Rogers, Sr.) describes a supercharger for delivering supercharged air to an engine, and which includes a shrouded axial compressor, a radial compressor which is located downstream of the axial compressor and a housing. The housing has four sections, including a section defining a highly convergent, frustoconical transition duct which favorably directs the discharge of the axial compressor to the inlet of the radial compressor and a hollow, highly convergent, exhaust cone section immediately downstream of the radial compressor which converges into the exhaust port of the supercharger. An annular flow deflector is provided for directing the discharge of the radial compressor into the exhaust cone.

U.S. Pat. No. 6,360,731 (Chang) describes an axial-type supercharger that has an impeller with multiple impeller blades adapted to be rotatably mounted in the intake manifold of an automobile, a motor with a shaft extending into an axial channel in the impeller to rotate the impeller, and a bracket adapted to be mounted on an end face of the intake manifold between the motor and the impeller. The supercharger further has an air filter directly mounted on the intake manifold upstream from the motor to filter out the pollutants in the air.

U.S. Pat. No. 11,193,391 (Iwakiri) describes a supercharger including a hollow housing, a rotating shaft rotatably supported by the housing, a turbine provided at one axial end of the rotating shaft, and a compressor provided at the other axial end of the rotating shaft. A threaded section and a circular column section are axially arranged at the other end of the rotating shaft. A threaded hole with which the threaded section is engaged and a fitting hole in which the circular column section is fitted are axially arranged in the compressor. The axial length of the circular column section and the fitting hole is set to be greater than the axial length of the threaded section and the threaded hole.

U.S. Pat. Appln. Publ. No. 20160177897 (Naruoka et al.) describes a supercharger that pressurizes intake air for an engine. The supercharger includes a centrifugal impeller and an impeller housing covering the impeller. The impeller housing has a spiral chamber which forms a discharge passage for air compressed by the impeller; and a diffuser chamber defined downstream of the spiral chamber.

Another use for a superchargers is in a HVAC system as described in U.S. Pat, Appln. Publ. No. 20220340303 (Benson) which describes an HVAC system having a duct with an inlet and an outlet. A first supercharger is disposed in the duct. A second supercharger is disposed in the duct in parallel with the first supercharger. A gearbox has a first output shaft coupled to the first supercharger and a second output shaft of the gearbox coupled to the second supercharger. A first evaporation coil is disposed in the duct between the supercharger and inlet. A second evaporation coil is disposed in the duct between the supercharger and outlet. A heater is disposed in the duct between the supercharger and outlet.

Another prior art reference is U.S. Pat. No. 9,982,590 (Hashimoto et al.).

OBJECTS AND SUMMARY OF THE INVENTION

It is an object of at least one embodiment of the present invention to provide new and improved superchargers that are simple and quiet.

It is another object of at least one embodiment of the present invention to provide new and improved superchargers that are more efficient than existing superchargers.

It is yet another object of at least one embodiment of the present invention to provide new and improved superchargers that do not have a heat relative problem.

It is yet another object of at least one embodiment of the present invention to provide new and improved superchargers that reduce the detonation tendency of internal combustion engines, air compressors and water pumps.

It is yet another object of at least one embodiment of the present invention to provide new and improved superchargers that increase engine efficiency.

It is yet another object of at least one embodiment of the present invention to provide new and improved superchargers that provide better/improved fuel combustion.

It is yet another object of at least one embodiment of the present invention to provide new and improved superchargers that reduce the environmental impact.

In order to achieve one or more of these objects, and possibly others, a supercharger in accordance with the invention includes a housing having a truncated conical shape formed by a conical wall with an open, inlet end and an open, discharge end, a first rotatable shaft having a forward end in the housing, a first compressor wheel attached to the forward end of the first shaft and situated in the housing, a second rotatable shaft that surrounds an axial portion of the first shaft and has a forward end in the housing, and a second compressor wheel attached to the forward end of the second shaft and situated in the housing. The second compressor wheel is situated closer to the inlet end of the housing than the first compressor wheel. The first and second compressor wheels each include a tapering outer ring and blades between the outer ring and the first or second shaft, respectively. Rotation of the first and second shafts causes rotation of the first and second compressor wheels and compression of air (or water) by the supercharger with the compressed air (or water) being discharged from the housing at the discharge end.

In one embodiment, there are more than two shafts and compressor wheels, namely, an additional, third rotatable shaft that surrounds an axial portion of the second shaft and has a forward end in the housing; and a third compressor wheel attached to the forward end of the third shaft and situated in the housing. The third compressor wheel is situated closer to the inlet end of the housing than the second compressor wheel. The third compressor wheel includes a tapering outer ring and blades between the outer ring and the third shaft. The shafts are arranged such that the first shaft has a rear end outside of the housing, the second shaft has a rear end outside of the housing and not overlying the rear end of the first shaft, and the third shaft has a rear end outside of the housing and not overlying the rear end of the second shaft.

The blades of the compressor wheels can have different sizes. For example, the blades of second compressor wheel are larger than the blades of the first compressor wheel, and the blades of the third compressor wheel are larger than the blades of the second compressor wheel.

The tapering outer ring of each of the compressor wheels is spaced uniformly from an inner surface of the housing. The blades may be equiangularly spaced about the respective shaft. The blades may be oriented such that a leading edge is closer to the inlet end than a trailing edge. Also, the blades may be fixed to or integral with the respective shaft and fixed to or integral with the respective tapering outer ring.

BRIEF DESCRIPTION OF THE DRAWINGS

The invention, together with further objects and advantages thereof, may best be understood by reference to the following description taken in conjunction with the accompanying drawings, wherein like reference numerals identify like elements, and wherein.

DETAILED DESCRIPTION OF THE INVENTION

Figure 1:
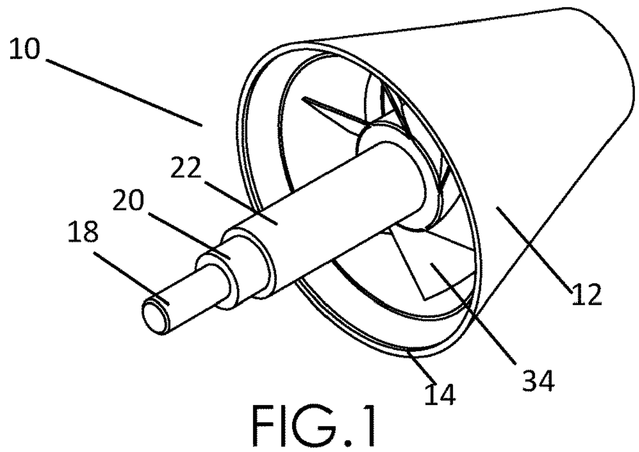
FIG. 1 is a perspective view of a fan compressor supercharger/water pump in accordance with the invention.
Figure 2:
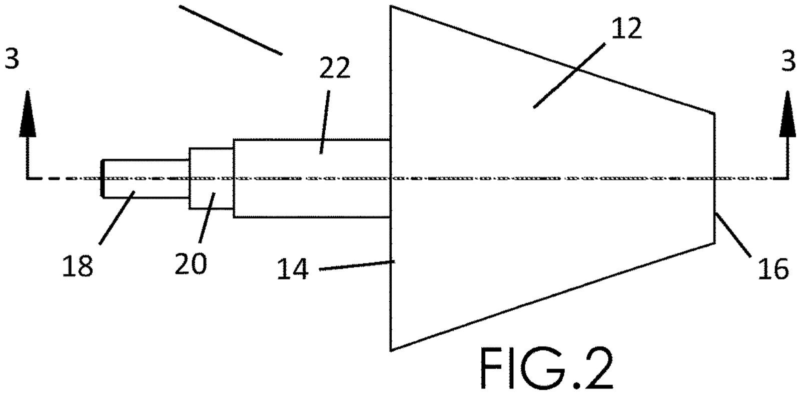
FIG. 2 is a side view of the fan compressor supercharger/water pump shown in FIG. 1.
Figure 3:
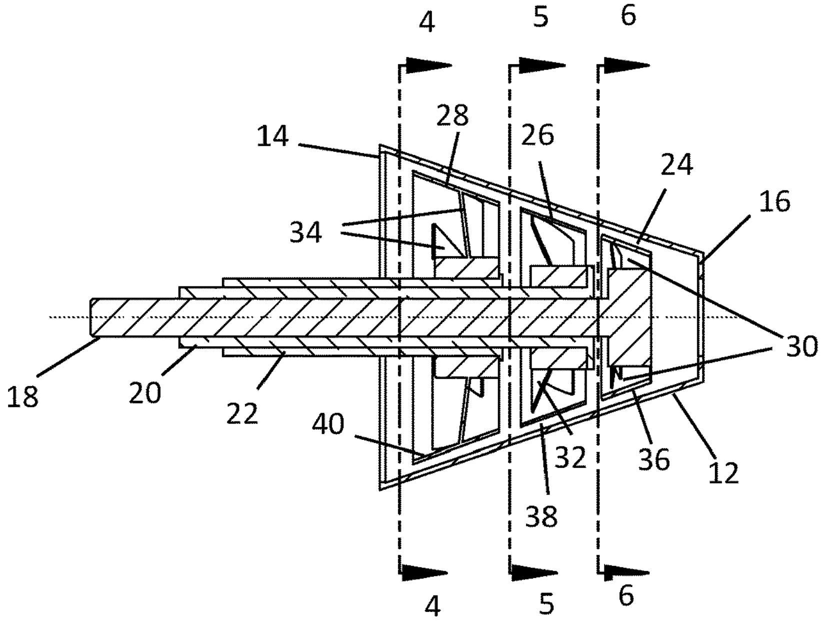
FIG. 3 is a cross-section taken along the line 3-3 in FIG. 2.

Referring to the accompanying drawings wherein the same reference numbers refer to the same or similar components, a supercharger 10 in accordance with the invention includes a compressor housing 12 having a truncated conical shape formed by a conical wall with an open front or inlet end 14 through which air or water, enters into an interior of the housing 12 and an open rear or discharge end 16 through which the compressed air/water exits the housing 12. Housing 12 is rigid and strong enough to withstand the pressures of the compressing air/water in the interior of the housing 12. The cross-sectional area of the housing 12 therefore describes, preferably at a uniform rate, from the inlet end 14 to the discharge end 16.

The supercharger 10 can be used in place of existing superchargers, including those disclosed in prior art mentioned herein, with appropriate modifications that would be readily determined by those skilled in the art to which this invention pertains.

Supercharger 10 includes a plurality of independently rotatable shafts 18, 20, 22 with shaft 18 being the innermost shaft, surrounded by an intermediate shaft 20 which in turn is surrounded by an outer shaft 22. By surrounding a shaft, it is meant that the shaft, which is a tubular construction for all surrounding shafts 20, 22, is axially outward from and circumferentially around the underlying shaft. A series of tubes is therefore provided by the shafts, all around a central, potentially solid shaft. The axial rear ends of the shafts 18, 20 are not surrounded by the overlying or surrounding shaft(s) 20, 22 and also an axial front portion of the underlying shafts 18, 20 is not surrounded by the overlying or surrounding shaft(s) 20, 22 since there needs to be space for the compressor wheels to extend from the shafts, described below. Thus, the axial rear ends of the shafts 18, 20, 22 can be connected to a device that provides rotational force to compressor wheels 24, 26, 28 connected to or integral with the shafts 18, 20, 22. The compressor wheels 24, 26, 28 rotate clockwise.

Shaft 22 connects to a largest, smaller pressure compressor wheel 28 that is closest to the front inlet end 14 of the housing 12. Shaft 20 connects to an intermediate size, intermediate pressure compressor wheel 26. Shaft 18 connects to a smallest, highest pressure compressor wheel 24 that is closest to the rear discharge end 16 of the housing 12. The axial length of the shafts 18, 20, 22 can vary as needed, but as shown, the shaft 18 extends further forward than shaft 20 which in turn extends further forward than shaft 22. Appropriate bearing structure is provided between the shafts 18, 20, 22 to enable them to rotate relative to one another, such bearing means being known to those skilled in the art to which the invention pertains. Shafts 18, 20, 22 should be rigid to enable optimal use, along with housing 12.

Compressor wheels 24, 26, 28 each have substantially the same construction with the major difference between them being their size. The compressor wheels 24, 26, 28 are all entirely within the interior of the housing 12. Compressor wheel 28 has larger blades 34 than the blades 32 of compressor wheel 26 which in turn are larger than the blades 30 of compressor wheel 24. The blades 30, 32, 34 are arranged around a common central hub that in the case of compressor wheels 26, 28 is fixed or formed integral with the respective shaft 20, 22 and in the case of compressor wheel 24 is formed integral with the shaft 18 (see FIGS. 3-6). The blades 30, 32, 34 in each of the compressor wheels 24, 26, 28 are separated from one another (see FIGS. 4-6). The axial length of the compressor wheels 24, 26, 28 can also vary as needed or desired.

A tapering outer ring 36, 38, 40 is part of each compressor wheel 24, 26, 28, respectively. The tapering outer ring 36, 38, 40 of each of the compressor wheels 24, 26, 28 is preferably spaced uniformly from an inner surface of the truncated conical wall forming the housing 12. This distance may be the same for all of the compressor wheels 24, 26, 28 or the tapering outer rings 36, 38, 40 may be constructed to have different uniform distances from the inner surface of the housing 12. This means that one outer ring 36 may be one distance from the inner surface of the housing 12 whereas one or more of the other outer rings 38, 40 may be at a different distance from the inner surface of the housing 12.

The outer rings 36, 38, 40 taper in the sense that their diameter decreases in a direction from the inlet end 14 to the discharge end 16, which decrease may be uniform. Each outer ring 36, 38, 40 thus has a largest diameter at the end closest to the inlet end 14 and a smallest diameter at the end closest to the discharge end 16 of the housing 12. This decrease serves to reduce the cross-sectional area in which the water or air flows and causing compression thereof, the water or air being forced through the housing 12 by the rotation of the compressor wheels 24, 26, 28.

Figure 4:
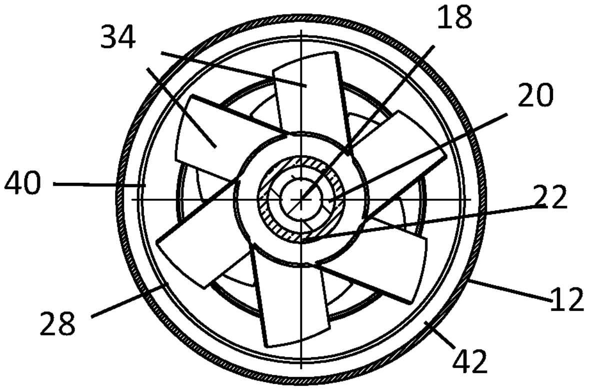
FIG. 4 is a cross-section taken along the line 4-4 in FIG. 3.
Figure 5:
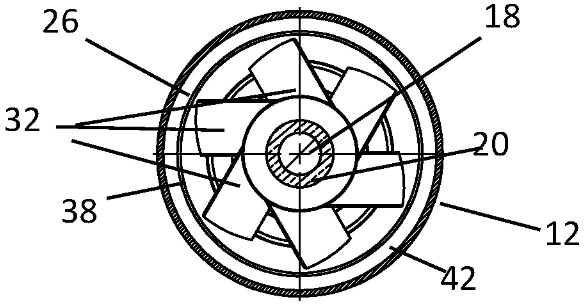
FIG. 5 is a cross-section taken along the line 5-5 in FIG. 3.
Figure 6:
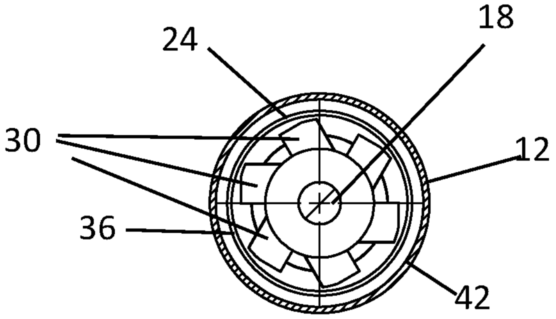
FIG. 6 is a cross-section taken along the line 6-6 in FIG. 3.

There are six blades 30, 32, 34 for each compressor wheel 24, 26, 28 equiangularly spaced about the central hub. The blades 30, 32, 34 are each oriented such that the leading edge is closer to the inlet end 14 than their trailing edge such that upon rotation, the water or air is compressed. The blades 30, 32, 34 are thus fixed at their inner lateral edges to the respective central hub or shaft and fixed at their outer lateral edges, opposite to the inner lateral edges, to the respective outer ring 36, 38, 40. Blades 30, 32, 34 are thus entirely between the respective outer ring 36, 38, 40 and the respective central hub or shaft. A hub may be provided on each shaft to which the inner lateral edges of the blades 30, 32, 34 are fixed if not to the shaft itself. The blades 30, 32, 34 are also angled relative to the radial direction, i.e., they do not extend directly radially outward from the hub or shaft but rather are angled forward as seen in FIGS. 4-6.

The blades 34 are smaller than the other blades with the size being considered in the axial direction. That is, the compressor wheel 24 has an axial length which is smaller than the axial length of compressor wheels 26, 28. The blades 32 are smaller than the blades 30 again considering the size in the axial direction. That is, the compressor wheel 26 has an axial length which is smaller than the axial length of compressor wheel 28.

The design of each of the outer rings 36, 38, 40 is optimized to minimize parasitic losses and maximize efficiency. The design conditions can be obtained through, for example, experimentation. One design criteria for the outer rings 36, 38, 40 is that its purpose is to prevent spreading of air/water into the space 42 between the conical wall of the housing 12 and the outer circumferential surfaces of the outer rings 36, 38, 40 and thereby increase efficiency of the supercharger 10 (or water pump). Also, the outer rings 36, 38, 40 reduce turbulence in the space 42 between the conical wall of the housing 12 and the outer circumferential surfaces of the outer rings 36, 38, 40 and their design could be optimized to this end as well.

In use, air or water enters the housing 12 through the inlet end 14 and as the compressor wheel 28 rotates, it causes compression of the air/water which then flows into engagement with compressor wheel 26. Compressor wheel 26 further compresses the air/water which then flows into engagement with compressor wheel 24. Compressor wheel 24 further compresses the air/water which is then discharged through the discharge end 16 of the housing 12. The compressor wheel 24 is spaced rearward apart from the discharge end 16 of the housing 12 to provide a space for further compression of the air/water between the first compressor wheel 24 and the discharge end 14. The means which cause rotation of the shafts 18, 20, 22 are not shown but may be any rotation structure known in the art of superchargers and water compression.

Advantages of the supercharger 10 include, but are not limited to, its simplicity, its low noise, and a reduction in heat detonation tendency. Other advantages are increasing engine efficiency, better, improved fuel combustion, and a reduction in the environmental impact.

There is also no heat problem generated by the supercharger 10 as it is in existing superchargers since, for example, there is air/water flow in the space 42 between the inner surface of the conical wall of the housing 12 and the outer circumferential surfaces of the outer rings 36, 38, 40. This air/water flow has a temperature-regulating effect and is also slightly compressed as it flows along the inner surface of the conical wall of the housing 12 from the inlet end 14 to the discharge end 16. This, there are in essence two flows through the interior of the housing 12. One flow is the compressed flow resulting from engagement of the air/water with the compressor wheels 24, 26, 28, and the other flow is the flow outward of the compressor wheels 24, 26, 28 in the space 42 and that rejoins the compressed air/water flow immediately prior to discharge from the housing 12 at the discharge end 16 thereof (see FIG. 3).

Supercharger 10 is shown with three shafts 18, 20, 22 and associated compressor wheels 24, 26, 28. However, this number of shafts and associated compressor wheels is not critical to the invention and any number of a plurality of shafts (minimum of two) and associated compressor wheels can be used in the invention. Generally, the revolutions per minute of the compressor wheels are different and the smaller compressor wheel has more revolutions per minute than the larger compressor wheels. The size of the compressor wheels 24, 26, 28 can vary and relate to the particular application of the supercharger 10.

Similarly, the compressor wheels 24, 26, 28 are shown with six blades on each compressor wheel. This number does not limit the invention and the compressor wheels can have a different number of blades, whether they all have the same number of blades or they have a different number of blades. The number of blades on the compressor wheels 24, 26, 28 is not a critical feature of the invention.

While particular embodiments of the invention have been shown and described, it will be obvious to those skilled in the art that changes and modifications may be made without departing from the invention in its broader aspects, and, therefore, the aim in the appended claims is to cover all such changes and modifications as fall within the true spirit and scope of the invention. Furthermore, the absence of structure in the drawings may be, in some embodiments, considered to indicate that such structure is intentionally lacking and omitted in an engine or other arrangement disclosed herein. The absence of such structure can, in some embodiments, provide benefits. The supercharger 10 is not limited to use with any specific fluid, whether air or water, and to any specific use. Finally, features of the above-identified prior art can be incorporated into the supercharger of the present invention, and the supercharger of the present invention applied in the application disclosed in the above-identified prior art to the extent the resultant combination does not deviate from the objectives and novelties of the invention.

The invention claimed is:

1. A supercharger, comprising:

a housing having a truncated conical shape formed by a conical wall with an open, inlet end and an open, discharge end;

a first rotatable shaft having a forward end in said housing;

a first rotatable compressor wheel attached to said forward end of said first shaft and being situated in said housing;

a second rotatable shaft that surrounds an axial portion of said first shaft and has a forward end in said housing; and a second rotatable compressor wheel attached to said forward end of said second shaft and being situated in said housing, said second compressor wheel being situated closer to said inlet end of said housing than said first compressor wheel, said first and second compressor wheels each including a tapering outer ring and blades between said tapering outer ring and said first or second shaft, respectively, said tapering outer ring of said first compressor wheel rotating upon rotation of said first shaft and said tapering outer ring of said second compressor wheel rotating upon rotation of said second shaft, said tapering outer ring of each of said first and second compressor wheels being spaced from an inner surface of said housing to define a flow space outward of said tapering outer rings of said first and second compressor wheels alongside said inner surface of said housing between said inlet end of said housing and said discharge end of said housing and in communication with said inlet end of said housing, whereby rotation of said first and second shafts causes rotation of said first and second compressor wheels and compression of air (or water) flowing into said inlet end by the supercharger with the compressed air (or water) being discharged from said housing at said discharge end, and whereby a portion of air (or water) entering into said housing through said inlet end flows into engagement with said blades of said first and second compressor wheels and another portion of air (or water) passes through said flow space alongside said inner surface of said housing, the portions rejoining prior to discharge from said housing at said discharge end.

2. The supercharger of claim 1, further comprising:

a third rotatable shaft that surrounds an axial portion of said second shaft and has a forward end in said housing; and a third rotatable compressor wheel attached to said forward end of said third shaft and being situated in said housing, said third compressor wheel being situated closer to said inlet end of said housing than said second compressor wheel, said third compressor wheel including a tapering outer ring and blades between said tapering outer ring and said third shaft, said tapering outer ring of said third compressor wheel rotating upon rotation of said third shaft, said tapering outer ring of said third compressor wheel being spaced from said inner surface of said housing such that said flow space is also outward of said tapering outer ring of said third compressor wheel.

3. The supercharger of claim 2, wherein said first shaft has a rear end outside of said housing, said second shaft having a rear end outside of said housing and not overlying said rear end of said first shaft, said third shaft having a rear end outside of said housing and not overlying said rear end of said second shaft.

4. The supercharger of claim 2, wherein said blades of said second compressor wheel are larger than said blades of said first compressor wheel, and said blades of said third compressor wheel are larger than said blades of said second compressor wheel.

5. The supercharger of claim 1, wherein said blades of said second compressor wheel are larger than said blades of said first compressor wheel.

6. The supercharger of claim 1, wherein said tapering outer ring of each of said first and second compressor wheels is spaced uniformly from said inner surface of said housing to cause compression of the air (or water) in said flow space as the air (or water) flows in the direction from said inlet end of said housing to said discharge end of said housing.

7. The supercharger of claim 1, wherein said blades are equiangularly spaced about the respective one of said first and second shafts.

8. The supercharger of claim 1, wherein said blades are oriented such that a leading edge is closer to said inlet end of said housing than a trailing edge.

9. The supercharger of claim 1, wherein said blades are fixed to or integral with the respective one of said first and second shafts and fixed to or integral with the respective one of said tapering outer rings, said tapering outer ring of said first compressor wheel having a front edge and a rear edge, said blades of said first compressor wheel being connected to said tapering outer ring of said first compressor wheel between the front and rear edges of said tapering outer ring of said first compressor wheel, said tapering outer ring of said second compressor wheel having a front edge and a rear edge, said blades of said second compressor wheel being connected to said tapering outer ring of said second compressor wheel between the front and rear edges of said tapering outer ring of said second compressor wheel.

10. The supercharger of claim 1, wherein said first shaft has a rear end outside of said housing, said second shaft having a rear end outside of said housing and not overlying said rear end of said first shaft.

11. The supercharger of claim 1, wherein said first and second compressor wheels are configured to rotate at different revolutions per minute such that said first compressor wheel has more revolutions per minute than said second compressor wheel.

12. The supercharger of claim 1, wherein said first and second shafts are configured to independently rotate using bearings between said first and second shafts.

13. The supercharger of claim 1, wherein said first compressor wheel is spaced rearward apart from said discharge end to provide a space for compression between said first compressor wheel and said discharge end.

14. A supercharger, comprising:

a housing having a truncated conical shape formed by a conical wall with an open, inlet end and an open, discharge end;

a first rotatable shaft having a forward end in said housing;

a first rotatable compressor wheel attached to said forward end of said first shaft and being situated in said housing;

a second rotatable shaft that surrounds an axial portion of said first shaft and has a forward end in said housing;

a second rotatable compressor wheel attached to said forward end of said second shaft and being situated in said housing, said second compressor wheel being situated closer to said inlet end of said housing than said first compressor wheel;

a third rotatable shaft that surrounds an axial portion of said second shaft and has a forward end in said housing; and a third rotatable compressor wheel attached to said forward end of said third shaft and being situated in said housing, said third compressor wheel being situated closer to said inlet end of said housing than said second compressor wheel, said first, second and third compressor wheels each including a tapering outer ring and blades between said tapering outer ring and said first, second or third shaft, respectively, said tapering outer ring of said first compressor wheel rotating upon rotation of said first shaft, said tapering outer ring of said second compressor wheel rotating upon rotation of said second shaft, and said tapering outer ring of said third compressor wheel rotating upon rotation of said third shaft, said tapering outer ring of each of said first, second and third compressor wheels being spaced from an inner surface of said housing to define a flow space outward of said tapering outer rings of said first, second and third compressor wheels alongside said inner surface of said housing between said inlet end of said housing and said discharge end of said housing and in communication with said inlet end of said housing, whereby rotation of said first, second and third shafts causes rotation of said first, second and third compressor wheels and compression of air or water flowing into said inlet end by the supercharger with the compressed air or water being discharged from said housing at said discharge end, and whereby a portion of air (or water) entering into said housing through said inlet end flows into engagement with said blades of said first, second and third compressor wheels and another portion of air (or water) passes through said flow space alongside said inner surface of said housing, the portions rejoining prior to discharge from said housing at said discharge end.

15. The supercharger of claim 14, wherein said first shaft has a rear end outside of said housing, said second shaft having a rear end outside of said housing and not overlying said rear end of said first shaft, said third shaft having a rear end outside of said housing and not overlying said rear end of said second shaft.

16. The supercharger of claim 14, wherein said blades of said second compressor wheel are larger than said blades of said first compressor wheel, and said blades of said third compressor wheel are larger than said blades of said second compressor wheel.

17. The supercharger of claim 14, wherein said tapering outer ring of each of said first, second and third compressor wheels is spaced uniformly from said inner surface of said housing to cause compression of the air (or water) in said flow space as the air (or water) flows in the direction from said inlet end of said housing to said discharge end of said housing.

18. The supercharger of claim 14, wherein said blades are equiangularly spaced about the respective one of said first, second and third shafts.

19. The supercharger of claim 14, wherein said blades are oriented such that a leading edge is closer to said inlet end of said housing than a trailing edge.

20. The supercharger of claim 14, wherein said blades are fixed to or integral with the respective one of said first, second and third shafts and fixed to or integral with the respective one of said tapering outer rings, said tapering outer ring of said first compressor wheel having a front edge and a rear edge, said blades of said first compressor wheel being connected to said tapering outer ring of said first compressor wheel between the front and rear edges of said tapering outer ring of said first compressor wheel, said tapering outer ring of said second compressor wheel having a front edge and a rear edge, said blades of said second compressor wheel being connected to said tapering outer ring of said second compressor wheel between the front and rear edges of said tapering outer ring of said second compressor wheel, said tapering outer ring of said third compressor wheel having a front edge and a rear edge, said blades of said third compressor wheel being connected to said tapering outer ring of said third compressor wheel between the front and rear edges of said tapering outer ring of said third compressor wheel.

* * * * *